(12) United States Patent
O'Brien et al.

(10) Patent No.: US 6,902,075 B2
(45) Date of Patent: Jun. 7, 2005

(54) CONTAINER CLOSURE

(75) Inventors: David John O'Brien, Hertfordshire (GB); Victor Sachs, Surrey (GB); Joseph Smelko, Ontario (CA); Robert William Thorstensen-Woll, Ontario (CA)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/359,287

(22) Filed: Feb. 6, 2003

(65) Prior Publication Data

US 2003/0196418 A1 Oct. 23, 2003

(30) Foreign Application Priority Data

Feb. 7, 2002 (EP) .............................. 02250852

(51) Int. Cl.⁷ ............................... B65D 39/00
(52) U.S. Cl. ...................... 215/232; 215/364
(58) Field of Search .................. 215/232, 359, 215/341, 347, 258, 349, 305, 350, 363, 364; 220/323, 347, 359; 295/258, 349, 365

(56) References Cited

U.S. PATENT DOCUMENTS

| | | | | |
|---|---|---|---|---|
| 4,013,188 A | * | 3/1977 | Ray ........................... | 215/347 |
| 4,109,815 A | * | 8/1978 | Collins, III .................. | 215/232 |
| 4,318,490 A | * | 3/1982 | Schneider ................... | 215/232 |
| 4,588,099 A | * | 5/1986 | Diez ........................... | 215/232 |
| 4,744,481 A | | 5/1988 | Levine | |
| 4,815,618 A | | 3/1989 | Gach | |
| 4,917,949 A | * | 4/1990 | Yousif ......................... | 428/349 |
| 4,961,986 A | | 10/1990 | Galda et al. | |
| 5,004,111 A | * | 4/1991 | McCarthy .................... | 215/232 |
| 5,197,618 A | * | 3/1993 | Goth ........................... | 215/232 |
| 5,265,745 A | * | 11/1993 | Pereyra et al. .............. | 215/232 |
| 5,433,992 A | | 7/1995 | Galda et al. | |
| 5,702,015 A | * | 12/1997 | Giles et al. .................. | 215/232 |
| 5,709,310 A | * | 1/1998 | Kretz .......................... | 220/270 |
| 5,860,544 A | * | 1/1999 | Brucker ...................... | 215/232 |
| 5,915,577 A | * | 6/1999 | Levine ........................ | 215/232 |
| 6,378,715 B1 | * | 4/2002 | Finkelstein et al. .......... | 215/341 |

FOREIGN PATENT DOCUMENTS

| | | | | |
|---|---|---|---|---|
| DE | 91 08 868.2 | | 10/1991 | |
| GB | 2 108 464 | | 5/1983 | |
| GB | 2 353 789 | | 3/2001 | |
| WO | WO 96/05055 | | 2/1996 | |
| WO | WO 97/02997 | * | 1/1997 | ................. 215/232 |
| WO | WO 96/61336 | | 12/1999 | |

* cited by examiner

Primary Examiner—Lien M. Ngo
(74) Attorney, Agent, or Firm—Lowe Hauptman & Berner, LLP

(57) ABSTRACT

A one-component seal and wadding system (1) for a screw-cap includes a seal (3) having lower layers (4,5) forming an induction heating sealable system for attaching the seal (3) to the neck of a container, a seal substrate (6) including a free tab (50) lying wholly within the circumference of the seal, a layer of liner (2), and an attachment element (10,11,12) including a release layer (11) for attaching the seal substrate (7) including the tab (50) to the wadding (2).

41 Claims, 3 Drawing Sheets

CONTAINER CLOSURE

BACKGROUND

When packaging a wide variety of materials ranging from pharmaceutical tablets to instant coffee in containers such as bottles and jars it is nowadays commonplace to provide a closure in the form of a seal connected to the neck of the container and a screw cap covering and protecting the seal and providing a reclosable cap after the seal has been removed to gain access to the contents of the container. A convenient way of providing such a closure is to provide the undersurface of the seal with a heat sensitive adhesive coating or a meltable plastics layer covered by a metal foil. The metal foil can provide the substrate of the seal or the seal may include a separate substrate made from paper or plastics material. Such a seal is then placed against the top of the neck of a container and sandwiched against it by the applied screw cap, whilst the closure is subjected to an induction heating step which heats the metal foil and in turn activates the heat sensitive adhesive layer or melts the plastics layer so that, on cooling, the seal bonds to the top of the neck of the container.

It is difficult for the eventual consumer to remove such seals and so attempts have been made to provide a tab extending sideways from the neck of the container so that the consumer can grip this to facilitate the removal of the seal. One difficulty with this is that the eddy currents induced in the foil during inductance heating are induced mainly in the periphery of the seal. When the seal includes a tab they are therefore induced around the edge of the tab which is remote from the neck of the container so that the seal is often not completely fixed to the top of the neck of the container adjacent the tab.

One way of overcoming this, which is proving popular at present, is the so-called "Top Tab" (Registered trademark) system, which is described fully in U.S. Pat. No. 4,961,986. This system includes a multilayer substrate which is partly delaminated to provide a lifting tab lying wholly within the circumference of the container neck. Typically, the lifting tab occupies about 50% of the seal area for seals of a diameter up to 36 mm and then the tab remains this size for seals of larger diameter. In U.S. Pat. No. 4,961,986 this is achieved by forming the substrate from multiple layers which are adhered together over only a part of their extent. U.S. Pat. No. 5,702,015 also discloses such a seal but, in this case, the sealed substrate is formed by an extrusion process in which a first layer of plastics material is extruded, followed by extrusion lamination of a second layer of release material using a third layer of extrusion material which is of the same composition to that of the first layer which integrates with the first layer where the second layer is not present. In this way the tab, which is formed by the third layer, is formed integrally with the first layer without the need for adhesive between the layers.

As shown in U.S. Pat. No. 4,961,986 the screw-cap may include some form of liner in addition to the seal material. At present, one of the difficulties of the "Top Tab" (RTM) system is that it is, essentially, a two-component system with the seal material and the liner provided separately and having to be fitted inside screw-cap in two separate operations. This naturally adds to the expense and difficulty of using the system. Accordingly, in commercial use, at present, the "Top Tab (RTM) System is normally used without a separate liner.

SUMMARY OF THE INVENTION

According to this invention a one-component seal and liner system for a screw-cap includes a seal having lower layers forming an induction heating sealable system for attaching the seal to the neck of a container, a seal substrate including a free tab lying wholly within the circumference of the seal, a layer of liner, and attachment means including a release layer for attaching the seal substrate including the tab to the liner.

Preferably the peel strength of the attachment means at the release layer is within a range from 20 to 90 grams at a rate of 1500 mm/min on a sample strip 25 mm wide. A more preferred range of peel strength is 50 to 60 g/25 mm under these conditions. The measurement of peel strength is carried out in a direction perpendicular to the strip.

Since the seal includes a free tab, its uppermost layer or layers are not completely attached to the remainder of the seal. It was expected that this partly de-laminated structure would lead to considerable difficulties when attempts were made to form a one-component wadding and seal system. However, we have discovered that this is not the case and, by incorporating a release layer in the attachment between the seal and the wadding the initial unscrewing of the screw-cap by the eventual consumer allows the two halves of the single component system to separate at the release layer without, in any way, damaging the liftable tab or seal.

Preferably the attachment means is formed by a layer of polyethylene terephthalate which forms the uppermost layer of the seal substrate, and which is coated with a release layer formed by nitrocellulose or a silicone compound, and a layer of low density polyethylene to act as an adhesive between the release layer and the undersurface of the liner. The nitrocellulose or silicone compound coated onto the polyethylene terephthalate bonds tightly onto this layer. The layer of low density polyethylene bonds tightly onto the wadding but frangibly onto the nitrocellulose or silicone layer. When subject to a parting force in a direction generally perpendicular to the seal and liner, the bond strength between the nitrocellulose or silicon compound and the polyethylene is easily exceeded so that the seal and liner components separate from one another.

The liner may be formed by a layer of food grade cardboard or a layer of foamed plastic material such as foamed polyethylene. In this later case a layer of polypropylene may be included between the foamed layer and the layer of low density polyethylene of the attachment means.

Alternatively, the attachment means can be formed from an upper layer of polyethylene terephthalate which forms the uppermost layer of the seal substrate which is coated with an adhesive layer. The bottom layer of the liner system can be a layer of PET which is coated with a release layer, for example cellulose acetate propionate (CAP) which is subsequently adhered to the adhesive layer of the attachment means. When subject to a parting force in a direction generally perpendicular to the seal and liner, the binding strength between the adhesive and coated PET is easily exceeded so the seal and liner components separate from one another with separation point being between the release layer and the upper PET layer.

The seal preferably includes an induction heating sealable system comprising a layer of aluminium foil coated on its lowermost face with a hot melt adhesive. A layer of polyethylene teraphthalate may be interposed between the hot melt adhesive and the aluminium foil layer to isolate the foil from the contents of the container and so prevent corrosion of the foil layer. The seal also includes a substrate which may include a paper laminate as described in U.S. Pat. No. 4,961,986 but preferably includes a layer of foamed polymer such as a foamed polyolefin, for example, polyethylene, bonded to the foil layer and a layer of polyethylene terephthalate bonded to the foamed layer. A further layer of polyethylene teraphthalate, nylon or polypropylene may be interposed between the layer of polyethylene teraphthalate and the foam in the region where they are not bonded together. The seal substrate may include an upper layer of foamed plastics such as ethylvinyl acetate foam interposed between the layer of polyethylene foam and the layer of polyethylene teraphthalate. In this way the liftable tab then also includes a foam layer.

The screw-cap is generally conventional and may include a multi-turn screw thread or a multi-start part turn screw thread. In one embodiment, it includes a circumferentially extending rib or series of fingers which hold the combined one-component liner and seal in place during initial application of the cap to the container and continue to hold the liner portion in place during subsequent opening and closing of the cap. Preferably the cap is arranged so that there is sufficient clearance between the top of the cap and the rib or fingers that the entire one-component liner and seal can rotate with respect to the cap. This allows the liner to be separated from the seal under a peel force perpendicular to the liner and seal.

The container may be made of glass or plastics material such as polyethylene, polyester, polyvinyl chloride, polypropylene, polystyrene or acrylonitrile butadiene styrene.

The present invention further discloses a method of manufacture of a vessel closing assembly for adhesion into a screw cap in which a liner laminate comprising a substrate layer and a layer of stiff film on at least one side of the substrate later, having an attachment surface for attachment to the seal laminate, is attached to a seal laminate comprising induction heat sealable layers for sealing at one side to a container and comprises at least one stiff film layer and an attachment surface at the other side whereby the attachment surface of the seal laminate faces the side of the liner laminate formed by the stiff film, the joining involving the steps of:

providing a release surface on one of the attachment surfaces;

applying a pressure sensitive adhesive composition, from a liquid composition, to one of the attachment surfaces and drying the composition to leave an adhesive coating; and contacting the attachment surfaces to adhere the liner laminate to the seal laminate.

Following the manufacture, the said vessel closing assemblies are cut from the pair of adhered laminates and adhered into screw caps in a procedure separate to the laminate adhesion. The vessel closing assembly is adhered into said screw cap by means of a hot melt adhesive. The screw cap is then screwed onto a container containing a liquid or a solid substrate which can optionally be potable or edible such that the induction heat sealable surface is in contact with the mouth of the container. The seal is then adhered to the mouth of the container by induction heating.

Preferably the stiff film is formed from polyethylene ester or a polypropylene, preferably polyethylene terephthalate (PET). Preferably the stiff film is white PET, in particular Melinex 891 (Trade Mark) supplied by Dupont.

Preferably the thickness of the stiff film is in the range 5 to 40 $\mu$m. Where the thickness of the stiff film used is at the lower end of the preferable range, it is advantageous to include an additional layer of polypropylene laminated to the PET layer. This ensures an ease of handling and avoids the formation of wrinkles in the thin PET layer.

It has been found that Melinex 891 has a very marked effect on reducing bond values of coatings applied to the non-treated side of this material. A clear polyester is not appropriate to be in direct contact with the release coating as the bond formed to the coating would be too strong. It is believed that this difference lies in the fact that in comparison to clear polyester which has a very smooth surface, white polyester has a microvoided" surface which is low gloss. A clear polyester can be used in the case where it is coated with a silicone release coating which will subsequently be partially transferred to the adhesive. A further advantage gained from the use of polyesters is that there are no related safety issues. The use of polyester is acceptable for all purposes including those involving contact with food.

The release surface is provided by coating the relatively stiff film with release material. Where the stiff layer is white PET, preferably the release material is a cellulose acetate proprionate (CAP). CAP coatings are applied from an isopropanol solution. Appropriate CAP materials are supplied by Eastman Chemical supplies and in particular, CAP 504-0.2 (Trade Mark) is preferable.

Preferably the coating weight of the CAP layer is in the range 1 to 3 g/m$^2$.

CAP has been chosen because it is a product which has not been modified with other materials and therefore a smaller variation in bond behaviour is expected. CAP also has a relatively high melting point meaning that it is unlikely to be affected by the heat during the induction sealing process. Upon application of a torque, separation occurs between the attachment surface of the stiff layer and the release layer.

Preferably the peel strength of the attachment surface at the release layer is within the range 20 to 90 grams at a rate of 1500 mm/min on a sample strip 25 mm wide. A more preferred range of peel strength is 30 to 60 g/25 mm under these conditions. The measurement of peel strength is carried out in a direction perpendicular to the strip.

The bond between the release surface and the adhesive must be greater in strength than the bond between the attachment surface and the release surface. This is important as it ensures that the adhesive remains on the seal portion adhered to the cap. It would be undesirable to have the adhesive in the cap as it would cause problems when resealing the bottle.

It has also been found that a nitrocellulose-based lacquer works in the place of CAP. In particular the product TLKGS0035562 (Trade Mark) supplied by Sun Chemical was found to have the appropriate properties.

Alternatively, in the case where the stiff layer is PET, the coating used is silicone. Silicone release coated polyester film is available from Vitex Packaging Inc. The silicone only bonds very weakly to the adhesive and upon application of a torque the bond is broken. A portion, but not all, of the silicone is transferred to the adhesive to render it no longer tacky.

Preferably the pressure sensitive adhesive is formulated with a natural or synthetic latex with rubbery properties. This introduces the characteristic that the adhesive is relatively soft and extensible thus mechanical stability of the laminate is achieved. The term "soft" is used in the present invention to indicate that the adhesive has high elongation properties.

Preferably there is no organic solvent present in either the dispersed or continuous phase of the adhesive. After coating one of the attachment surfaces the adhesive is subsequently dried to give a stable structure which can be easily manipulated.

Preferably the coating weight of the pressure sensitive adhesive composition is in the range 3 to 6 g/m²

Where the release layer is formed from CAP or a nitrocellulose based lacquer, it is preferable that the pressure adhesive composition has a degree of tackiness. This tackiness is not evident to the person opening the cap as a continuous layer of CAP or nitrocellulose will cover the adhesive layer once the cap has been removed. The degree of tackiness varies depending on the particular composition used. Use of a tacky adhesive contributes to an ease of laminating materials together and the heat and pressure during the laminating step can be adjusted to allow for the variation in tackiness.

It is also possible to use the above described pressure sensitive adhesive composition with a silicone coated polyester film but only in the case where there is a partial transfer of the silicone material to the adhesive layer.

Preferably the pressure sensitive adhesive composition is either 9126 (Trade Mark) or XS120 (Trade Mark) supplied by Dyna-Tech.

In the case where the stiff film is a silicone coated polyester, it is preferable to use a cohesive adhesive. Cohesive adhesives are used industrially in packaging processes and are not tacky. Such adhesives are specifically designed to bond to themselves upon application of pressure only. No heat is required. In the present invention, these adhesives are not used in this manner. Instead, their very low tack nature is being exploited such that the presence of these adhesives on the top of a liner does not cause any consumer concern. Cohesive adhesives provide an effective means of laminating the structures together, providing stable laminates even where the area of bonding is reduced to as little as 25%. Use of these adhesives simplifies the structure and thus results in a reduction in associated costs. A cohesive adhesive is applied from an aqueous solution or appropriate solvent to the upper surface of the seal laminate and the layer to which it is applied is corona treated prior to this application to ensure that a strong bond results between the seal laminate and the adhesive.

The cohesive adhesives used in the present invention were supplied by Sovereign Packaging Group Inc. Particularly suitable materials are Primaseal 22–184 (Trade Mark) and Primaseal 22–185 (Trade Mark).

Preferably the thickness of the liner is in the range 0.4–1.2 mm. Preferably the liner is formed from polypropylene faced polyethylene foam. It is preferable that the density of the liner is in the range 250 to 500 g/l.

It is important that the stiffness of the secondary liner is appropriate. The secondary liner is formed from both the stiff film layer and the liner and it is the overall stiffness of the composite rather than the individual stiffness of the components which is of importance. If the film is not sufficiently stiff then upon opening the cap, unacceptable torquing of the liner will occur leading to unacceptable distortion of the liner. This is detrimental to the secondary seal and makes it more difficult to separate the seal and liner portions as the required shear forces cannot be generated.

For the purposes of the present invention, stiffness is defined as a resistance to distortion of the secondary liner when the cap is removed form the body.

Appropriate composites were determined by comparative testing. It has been found that use of a foam with a higher foam density, use of a foam made from a higher density resin and use of a foam surfaced with a material having a higher tensile modulus results in a secondary liner less prone to distortion upon application of a shear force.

Polypropylene has a higher tensile modulus than polyethylene foam and therefore by coating the surface of the polyethylene foam with polypropylene to give a polypropylene faced polyethylene foam, a stiffer foam is obtained. Preferably the thickness of the polypropylene layer is in the range 20–50 µm. In particular, the product Sureseal 626 (Trade Mark) supplied by J S Plastics was found to have te appropriate properties.

BRIEF DESCRIPTION OF THE DRAWINGS

Three embodiments of a one component liner and seal system in accordance with this invention will now be described with reference to the accompanying drawings, in which:—

DETAILED DESCRIPTION OF THE INVENTION

Figure 1:
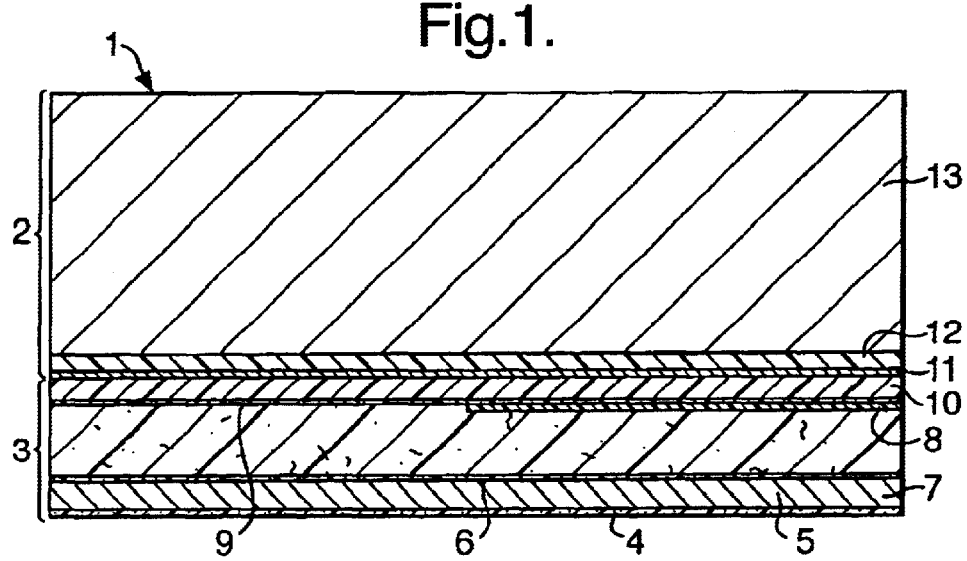
FIG. 1 is a cross-section through a first example with a vertical dimension greatly exaggerated.

The one-component liner and seal 1 comprises a wadding portion 2 and a seal portion 3 attached together. The one-component wadding and seal 1 is formed by a laminate of a number of layers which, starting from the bottom comprise a coating of hot melt adhesive 4 deposited typically at a rate of in the range 25 to 38 g/m² and may include polyester coatings, ethylene vinyl acetate, polypropylene, ethylene-acrylic acid co-polymers, or Surlyn (rtm); a layer of aluminium foil 5 for instance 20 or 25 microns thick; a layer of polymeric adhesive 6 applied, for instance at a rate in the range of 3 g/m² to 20; a layer of polyethylene foam 7 125–250 microns thick, a layer of polyethylene terephthalate 8 extending only part way across the layer of foam 7 and not adhered to the layer of foam 7; a layer of polymeric adhesive 9 applied, for instance at a rate of 50 g/m²; a layer of polyethylene terephthalate layer 10 23 microns thick which is adhered both to the foam 7 and the polyethylene terephthalate layer 8; a layer 11 of nitro-cellulose applied at a rate of 1–2 g/m², which acts as a release layer; a layer 12 of low density polyethylene deposited at a rate of 20 g/m²: and, a layer 13 of food grade cardboard typically 700 to 900 microns thick.

The adhesive layers 6 and 9 are typically ethylene vinyl acetate copolymer, polyethylene or polyurethane. The layer of low density polyethylene 12 is typically applied in a molten state and, on cooling, bonds tightly to the cardboard 13 and adequately to the nitrocellulose layer 11.

Figure 4:
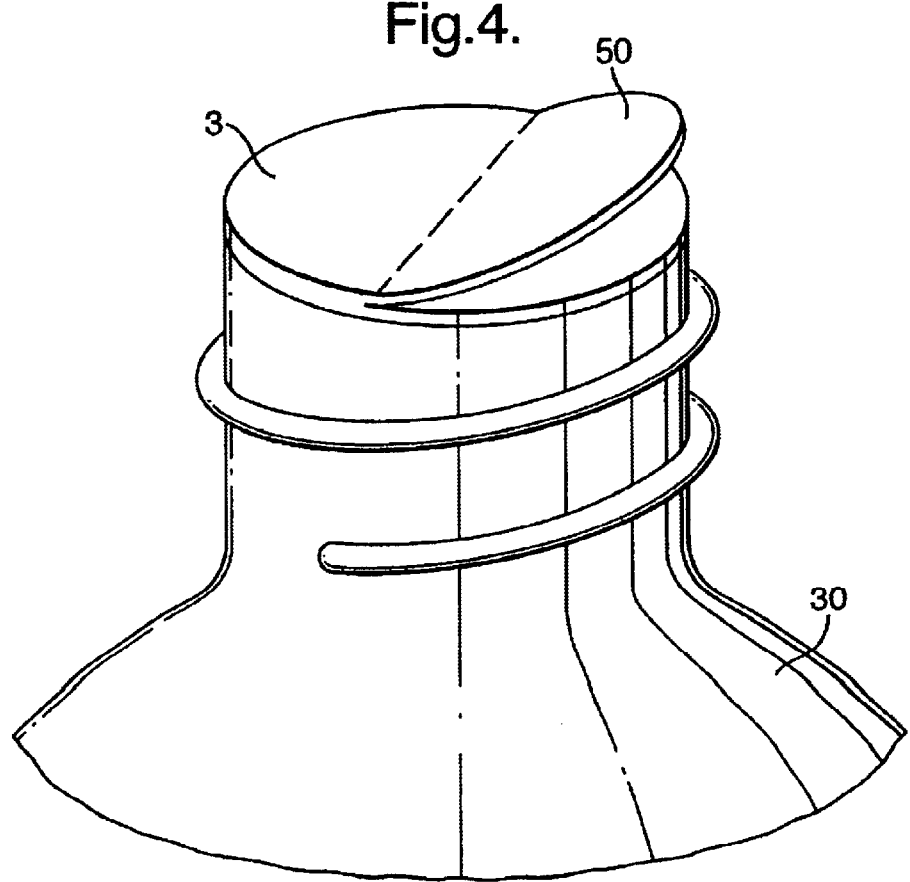

As a result of the presence of the polyethylene teraphthalate layer 10, the nitrocellulose layer 11 and the low density polyethylene layer 12 a pond is formed between the seal portion 3 and the liner portion 2. However, this attachment includes a weakened zone formed by the weak bond formed between the release layer 11 and the low density polyethylene layer 12. This bond is adequate to hold the two portions 2 and 3 together during subsequent processing and handling but weak enough so that when subjected to an appropriate parting force in the upright direction as shown in the Figures, the liner portion 2 separates from the seal portion 3. The presence of the polyethylene terephthalate partial layer 8 and the fact that it is not bonded to the foam layer 7 provides a separate tab portion formed by the layer 8 and 10 which is not adhered to the layer 7 and so forms a liftable tab 50 (shown in FIG. 4) which will be described subsequently.

Figure 2:
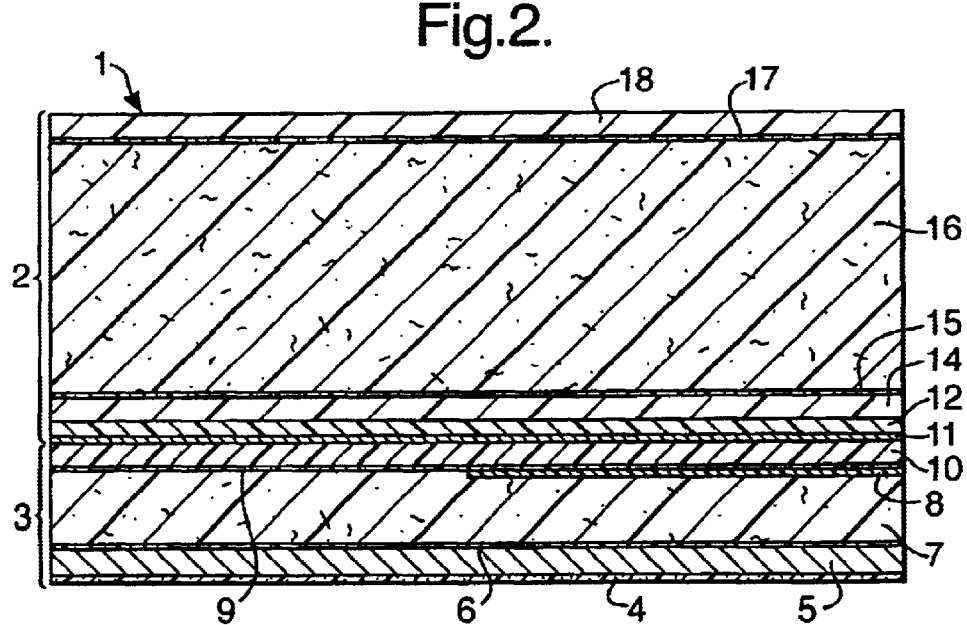
FIG. 2 is a cross-section through a second embodiment, again with a vertical dimension greatly exaggerated.
Figure 3:
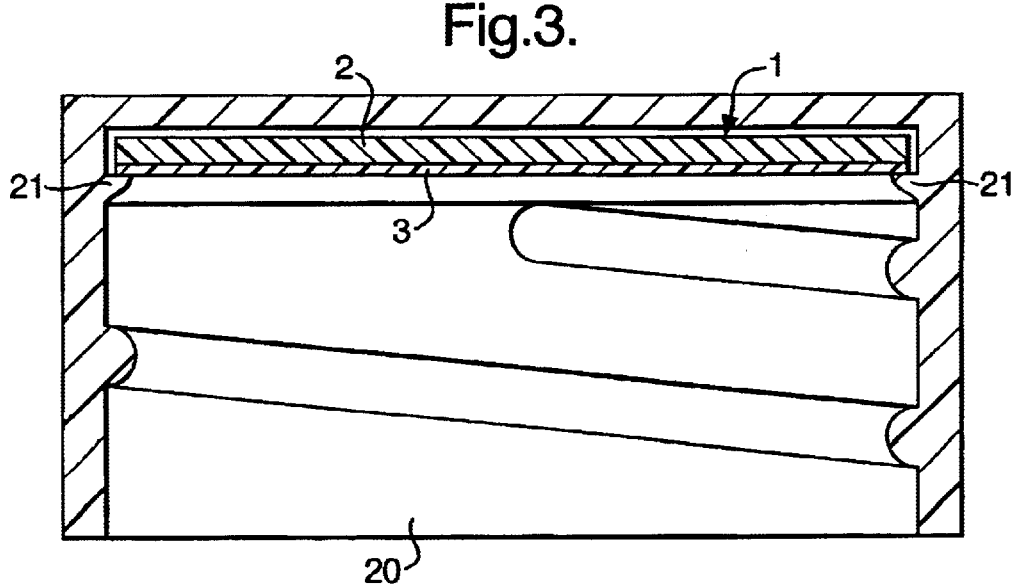
FIG. 3 is a cross-section through a screw cap showing the liner and seal in place; and, FIG. 4 is a perspective view showing the seal in place on the neck of a container.

The second embodiment which is shown in FIG. 2 is identical to the first from the layer 4 to the layer 12 but, in this example the layer 12 is attached to a layer 14 of polypropylene film 20 microns thick. A layer of polypropylene polyethylene polymeric adhesive 15 applied at a rate of 20 g/m² adheres the polypropylene layer 14 to a layer of expanded polyethylene foam 16 of typical thickness 1.0 or 1.6 mm. A layer of polypropylene polyethylene polymeric adhesive 17 applied at a rate of 20 g/m² adheres the expanded polyethylene foam 16 to a layer 18 of polypropylene film of 20 microns thick. In this second embodiment the liner portion 2 is essentially formed by an expanded polyethylene foam 16 covered by polypropylene layers 14 and 18 which replaces the food grade cardboard used in the first example.

After formation of the laminate it is die cut to form individual discs of one-component liner and seal 1. The one-component liner 1 is press-fitted inside the top of a screw cap 20 and held in place by a circumferential rib 21. The one-component liner and seal 1 is sized so as to be able to rotate freely in the top of the cap 20 whilst, at the same time, being held securely in place by the rib 21. In use, a screw cap equipped with a one-component liner and seal 1 in accordance with the present invention is screwed onto the open neck of a bottle 30 so sandwiching the one-component liner and seal 1 between the open neck of the bottle 30 and the top of the cap 20. The cap 20 and bottle 30 are then subjected to an induction heating step in which the aluminium foil 5 is heated around its periphery by the generation of eddy currents within it which, in turn, melts the coating 4 of hot melt adhesive to bond the seal portion 3 onto the open neck of the bottle 30. The sealed container is then distributed.

When the screw cap 20 is removed from the bottle 30 by the eventual user the seal portion 3 remains adhered to the open neck of the bottle 30 whilst the liner portion 1 is retained by the rib 21 in the top of the cap 20. The seal portion 3 and liner portion 2 part at the nitrocellulose release layer 11 during this initial removal of the cap 20 from the neck of the bottle 30. The eventual consumer can then easily remove the seal portion 3 from the neck of the bottle 30 merely by gripping the tab portion 50 formed by the layers 8 and 10 with the manual force applied to the tab 50 overcoming the adhesion provided between the hot melt coating 4 and the neck of the bottle 30 to enable the entire seal portion 3 to be removed to allow the eventual user to gain access to the contents of the bottle 30. The liner portion 2 remains adhered within the cap to form a secondary seal when reclosed.

Figure 5:
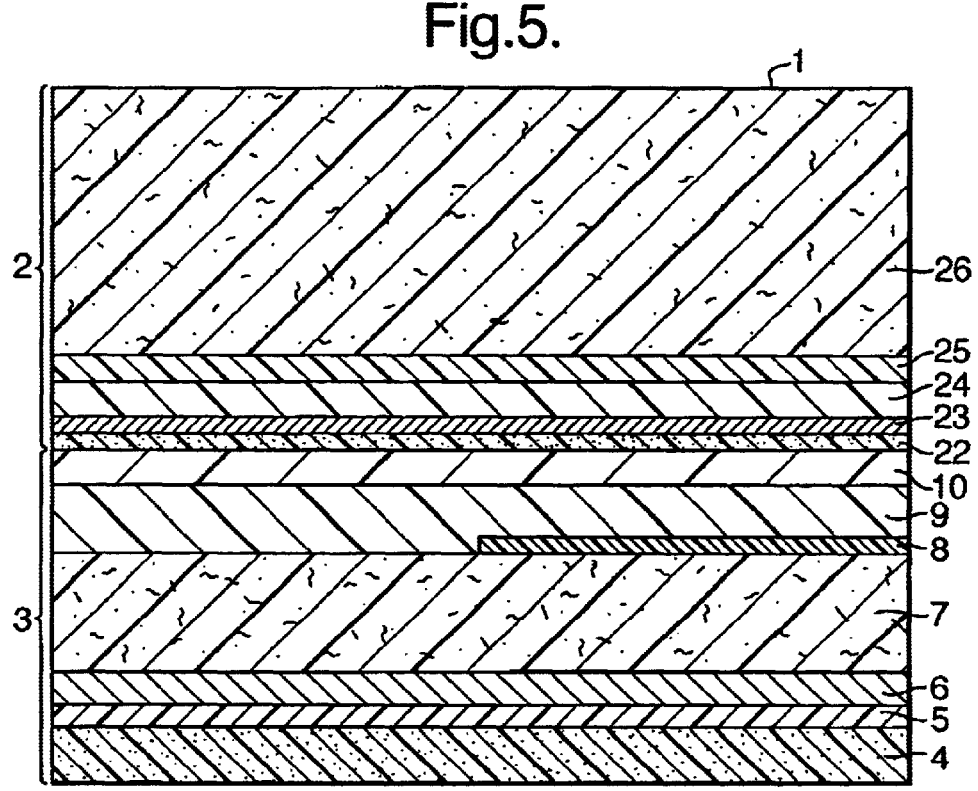
FIG. 5 is a cross section through a third embodiment, again with a vertical dimension greatly exaggerated.

The third embodiment which is shown in FIG. 5 is identical to the first from the layer 4 to the layer 10. The liner laminate 2 is formed by application of a layer of CAP coating 23 from an isopropanol solution to the white polyester film surface 24 of a laminated structure formed from a layer of white PET film with a thickness in the range 8 to 40 μm laminated to a layer of polypropylene film with a thickness in the range 30 to 50 μm. A pressure sensitive coating 22 is then applied from an aqueous solution to the CAP layer 23 wherein the coating weight of the adhesive layer is in the range 3 to 6 g/m² The layer 22 is then dried to leave a tacky stable adhesive layer to which the attachment surface formed of white PET 24 coated with CAP to form a release layer 23, is subsequently adhered by a heat and pressure lamination step. The binding of layers 22 and 23 is sufficiently strong so as to give a stable system but weak enough that only weak shear forces are required to separate the two layers. A layer of polypropylene faced polyethylene foam 26 is then adhesively laminated to the upper surface of the polypropylene film 25 to give the completed vessel closing assembly wherein the foam layer has a thickness in the range 0.4 to 1.1 mm and a density in the range 250 to 500 g/l.

Following the formation of the laminate, it is die cut to form discs of the vessel closing assembly 1. The vessel closing assembly 1 is fixed inside the top of a screw cap 20 by means of hot melt adhesive. A screw cap equipped with a vessel closing assembly in accordance with the present invention is screwed onto the open neck of a bottle thus sandwiching the vessel closing assembly 1 between the open neck of the bottle and the top of the cap. The cap 20 and the bottle 30 are then subjected to an induction heating step in which the aluminium foil is heated around its periphery by the generation of eddy currents within it which, in turn, melts the coating 4 of the hot melt adhesive to bond the seal portion onto the open neck of the bottle. The sealed container is then distributed.

When the screw cap is removed from the bottle by the eventual user, the seal laminate 3 remains adhered to the open neck of the bottle 30 whilst the liner remains fixed in the cap 20. The seal and liner portions separate between the release and attachment layers, specifically layers 23 and 24. The CAP coating of the attachment surface 23 is transferred to the adhesive layer 22 so the top of the seal portion is no longer left tacky.

In this embodiment, the seal portion includes a tab 50 so the eventual user can easily remove the seal portion 3 from the neck of the bottle 30 by gripping the tab portion 8 and the manual force applied to the tab overcomes the adhesion provided between the hot melt coating 4 and the neck of the bottle to enable the entire seal portion 3 to be removed to allow the user to gain access to the contents of the bottle. The liner portion 2 has remained glued into the cap 20 meaning that the bottle is resealable following the removal of the seal.

What is claimed is:

1. A unitary vessel closing assembly, comprising:
   a seal having
   an induction heating sealable layer for attaching the seal to container to be sealed, and
   a seal substrate including a free tab lying wholly within the circumference of the seal, and
   a liner releasably attached to the seal via a release layer;
   wherein the release layer is made of nitrocellulose or a silicone compound; and
   wherein an upper layer of the substrate is a layer of polyethylene terephthalate and the release layer comprises a layer of low density polyethylene attached on the undersurface of the liner.

2. The assembly according to claim 1, wherein the liner is formed by food grade cardboard or foamed plastic material.

3. The assembly according to claim 1, wherein the liner includes
   a layer of foamed plastics material, and
   a layer of polypropylene between the layer of foamed plastics material and the layer of low density polyethylene.

4. The assembly according to claim 1, wherein the seal substrate further has
a lower layer of foamed polymer, and
wherein the upper layer of polyethylene terephthalate is partially bonded to the lower layer of foamed polymer in a first region to provide the tab.

5. The assembly according to claim 4, wherein
the seal substrate further includes an intermediate layer of polyethylene terephthalate, nylon or polypropylene; and
the intermediate layer is interposed between the upper layer of polyethylene terephthalate and the lower layer of foamed polymer in a second region where the upper and lower layers are not bonded together.

6. The assembly according to claim 4, wherein the tab also includes a foamed layer.

7. A screw-cap, including
a top;
a side wall extending downwardly from the top to define an interior of said screw cap; and
a unitary vessel closing assembly positioned in said interior and adjacent said top of said screw cap, said assembly comprising:
a seal; and
a liner releasably attached to the seal via a release layer which is a coating on an underside of the liner;
wherein said seal comprises:
an induction heating sealable layer for attaching the seal to a container to be sealed;
a seal substrate attached to the induction sealable layer;
an upper layer that is bonded to the seal substrate in a first region and is not bonded to the seal substrate in a second region so as define, in said second region, a free tab lying wholly within the circumference of seal; and
an intermediate layer interposed between the upper layer and the seal substrate in the second region, wherein said intermediate layer is not bonded to the seal substrate in said second region, said assembly further comprising an adhesive layer located between and bonding said coating the upper layer of said seal, wherein said coating is transferable to said adhesive layer so as to render a top surface of said seal no longer tacky upon removal of the liner from the seal by an user opening the container, and wherein said coating adheres stronger to the adhesive layer than to the underside of the liner.

8. A container, comprising a mouth closed by a screw cap and containing a liquid or solid substance therein, said screw cap including
a top;
a side wall extending downwardly from the top to define an interior of said screw cap; and
a unitary vessel closing assembly positioned in said interior and adjacent said top of said screw cap, said assembly comprising:
a seal; and
a liner releasably attached to the seal via a release layer is a coating on an underside of the liner;
wherein said seal comprises:
an induction heating sealable layer for attaching the seal to a container to be sealed;
a seal substrate attached to the induction heating sealable layer;
an upper layer that is bonded to the seal substrate in a first region and is not bonded to the seal substrate in a second region so as to define, in said second region, a free tab lying wholly within the circumference of the seal; and
an intermediate layer interposed between the upper layer and the seal substrate in the second region, wherein said intermediate layer is not bonded to the seal substrate in said second region, said assembly further comprising an adhesive layer located between and bonding said coating to the upper layer of said seal, wherein said coating is transferable to said adhesive layer so as to render a top surface of said seal no longer tacky upon removal the liner from the seal by an user opening the container; and
wherein the induction heating sealable layer of said seal is sealed to the mouth of the container to enclose the liquid or solid substance therein; and
wherein said coating adheres stronger to the adhesive layer than to the underside of the liner.

9. The container according to claim 8, wherein the liquid or solid substance is potable or edible.

10. A method of manufacture of a vessel closing assembly, the method comprising the steps of:
providing a liner laminate and a seal laminate each having attachment surface;
depositing a release substance on a first one of the attachment surfaces; and
bonding the liner laminate and the seal laminate by an adhesive layer disposed between a second one of the attachment surfaces and the release substance;
wherein
a bonding force between the release substance and said first attachment surface is sufficiently weaker than that between the adhesive layer and release substance so that said release substance is transferable to the adhesive layer upon remove of the liner laminate from the seal laminate; and
said release substance is deposited on the first attachment surface in an amount sufficient to render the adhesive no longer tacky when said release substance is erred to said adhesive layer upon said removal of the liner laminate from the seal laminate.

11. The method according to claim 10, further comprising cutting the vessel closing assembly from the bonded laminates; and
adhering the cut vessel closing assembly into a screw cap.

12. The method according to claim 11, wherein the cut assembly is adhered into the screw cap by a hot melt adhesive.

13. The method according to claim 10, wherein the first attachment surface on which the release substance is provided is a surface of a relatively stiff film.

14. The method according to claim 10, wherein the release substance includes a cellulose acetate proprionate (CAP) coating on said first attachment surface.

15. The method according to claim 14, wherein the coating weight of the CAP layer is in the range 1 to 3 g/m$^2$.

16. The method according to claim 10, wherein the release substance includes a silicone coating on said first attachment surface.

17. The method according to claim 10, wherein the liner laminate is formed from foamed thermoplastics material.

18. The method according to claim 17, wherein the foamed thermoplastics material is polypropylene faced polyethylene foam.

19. The method according to claim 17, wherein the thickness of the foamed thermoplastics material the range 0.4 to 1.1 mm.

20. The method according to claim 17, wherein the density of the foamed thermoplastics material is in the range 250 to 500 g/L.

21. The method according to claim 13, wherein the relatively stiff film is formed from a polyester or polypropylene.

22. The method according to claim 21, wherein the relatively stiff film is polyethylene terephthalate.

23. The method according to claim 13, wherein the thickness of the relatively stiff film is in the range 8.0 to 40 µm.

24. The method according to claim 10, wherein the relatively stiff film is white polyethylene terephthalate.

25. The method according to claim 10, wherein the adhesive layer includes a pressure sensitive adhesive composition which formulated with a natural or synthetic latex with high elongation properties.

26. The method according to claim 13, wherein the adhesive layer includes a pressure sensitive adhesive composition which is applied to a surface of the release substance.

27. The method according to claim 10, wherein the adhesive layer includes a pressure sensitive adhesive composition which is applied to the second attachment surface which is a top surface of the seal laminate.

28. The method according to claim 10, wherein a peel strength of the first attachment surface at the release substance is in the range 20 to 90 g/25 mm.

29. The method according to claim 28, wherein a peel strength of the first attachment surface at the release substance is in the range 30 to 60 g/25 mm.

30. The method according to claim 10, wherein the adhesive layer includes a pressure sensitive cohesive adhesive.

31. A vessel closing assembly for adhesion into a screw cap, said assembly including
a seal laminate having
lower layers which form an induction heating sealable system for attaching the seal laminate to the neck of a container, and
an attachment surface at the top of said seal laminate,
a layer of a rubbery pressure sensitive adhesive coated on said attachment surface of the seal laminate with a coating weight in the range 3 to 6 g/m2,
a release layer and a stiff film layer, wherein the stiff film layer has a thickness in the range 8 to 40 µm and the release layer is adhered between the upper surface of the adhesive layer and the lower surface of the stiff film layer, and
a foamed thermoplastics liner with a thickness in the range 0.4 to 1.1 mm and a density in the range 250 to 500 g/l attached to the upper surface of the stiff film layer,
wherein:
the peel strength of the lower surface of the stiff film layer at the release layer is in the range 20 to 90 g/25 mm.

32. The vessel closing assembly according to claim 31, wherein the stiff film layer is polyethylene terephthalate.

33. The vessel closing assembly according to claim 31, wherein the release layer is cellulose acetate proprionate.

34. The vessel closing assembly according to claim 31, wherein the release layer is silicone.

35. The vessel closing assembly according to claim 31, wherein the foamed thermoplastics liner is polypropylene faced polyethylene foam.

36. A method according to claim 10, wherein the seal laminate further comprises a free tab lying wholly within the circumference of the seal.

37. A unitary vessel closing assembly, comprising:
a seal; and
a liner releasably attached to the seal via a release layer which is a coating on an underside of the liner;
wherein said seal comprises:
an induction heating sealable layer for attaching the seal to a container to be sealed;
a seal substrate attached to the induction heating sealable layer;
an upper layer that is bonded to the seal substrate in a first region and is not bonded to the seal substrate in a second region so as define, in said second region, a free tab lying wholly within the circumference of seal; and
an intermediate layer interposed between the upper layer and the seal substrate in the second region, wherein said intermediate layer is not bonded to the seal substrate in said second region;
said assembly further comprising an adhesive layer located between and bonding said coating to the upper layer of said seal, wherein said coating is transferable to said adhesive layer so as to render a top of said seal no longer tacky upon removal of the liner from the seal by an user opening the container, and wherein said coating adheres stronger to the adhesive layer than to the underside of the liner.

38. The assembly of claim 37, wherein said intermediate layer is bonded to said upper layer by another adhesive layer, said intermediate layer defining an underside of said free tab when said free tab is lifted up.

39. The assembly of claim 38, wherein said another adhesive layer also bonds the upper layer to the seal substrate in the first region.

40. The assembly of claim 37, wherein, upon said removal of the liner from the seal, the coating is transferred to the adhesive layer to completely cover the upper surface of said adhesive layer, thereby rendering the top of said seal no longer tacky.

41. The method of claim 10, wherein the step of providing the seal laminate comprises:
providing an induction heating sealable layer for attaching the vessel closing assembly to a container to be sealed;
attaching a seal substrate to a top surface of the induction heating sealable layer; and
partially bonding an upper layer to a top surface of the seal substrate in a first region so that said upper layer is not bonded to the seal substrate in a second region outside said first region to define in said second region a free tab;
said method further comprising
interposing an intermediate layer between the upper layer and the seal substrate in the second region without bonding the intermediate layer to the seal substrate in said second region so that said intermediate defines an underside of said free tab when said free tab is lifted up; and
depositing another adhesive layer under said upper layer to bond said upper layer to said seal substrate and said intermediate layer in the first and second regions, respectively.

* * * * *